US012195998B2

(12) United States Patent
Kunst et al.

(10) Patent No.: US 12,195,998 B2
(45) Date of Patent: Jan. 14, 2025

(54) MOTOR VEHICLE LOCK

(71) Applicant: Kiekert AG, Heiligenhaus (DE)

(72) Inventors: Frank Kunst, Lüdinghausen (DE); Andreas Ziganki, Mettmann (DE); Ömer Inan, Dorsten (DE)

(73) Assignee: Kiekert AG, Heiligenhaus (DE)

( * ) Notice: Subject to any disclaimer, the term of this patent is extended or adjusted under 35 U.S.C. 154(b) by 439 days.

(21) Appl. No.: 16/965,617

(22) PCT Filed: Jan. 22, 2019

(86) PCT No.: PCT/DE2019/100059

§ 371 (c)(1),
(2) Date: Jul. 29, 2020

(87) PCT Pub. No.: WO2019/144994

PCT Pub. Date: Aug. 1, 2019

(65) Prior Publication Data

US 2021/0040771 A1 Feb. 11, 2021

(30) Foreign Application Priority Data

Jan. 29, 2018 (DE) .................... 10 2018 101 892.4

(51) Int. Cl.
*E05B 17/08* (2006.01)
*E05B 81/06* (2014.01)
(Continued)

(52) U.S. Cl.
CPC .............. *E05B 17/08* (2013.01); *E05B 81/06* (2013.01); *E05B 81/20* (2013.01); *E05B 81/34* (2013.01); *E05B 85/02* (2013.01)

(58) Field of Classification Search
CPC .......... E05B 17/08; E05B 81/06; E05B 81/14; E05B 81/15; E05B 81/16; E05B 81/18;
(Continued)

(56) References Cited

U.S. PATENT DOCUMENTS 2,198,862 A * 4/1940 Chesler .................. E05B 77/50
180/289
3,679,277 A 7/1972 Dohmen
(Continued)

FOREIGN PATENT DOCUMENTS

DE 1138151 B 10/1962
DE 2004167 A1 8/1971
(Continued)

OTHER PUBLICATIONS

Translation of International Search Report issued Apr. 26, 2019 for PCT/DE2019/100059.

*Primary Examiner* — Christine M Mills
*Assistant Examiner* — Noah Horowitz
(74) *Attorney, Agent, or Firm* — Renner, Otto, Boisselle & Sklar, LLP

(57) ABSTRACT

A motor vehicle lock having a locking mechanism with a rotary latch and at least one pawl, comprising an electric drive unit. The drive unit interacts at least indirectly with the locking mechanism, and the drive unit has an electric motor with an output shaft and an output means secured to the output shaft, wherein means for guiding and/or binding a lubricant are arranged between the electric motor and the output means.

20 Claims, 2 Drawing Sheets

(51) Int. Cl.
*E05B 81/20* (2014.01)
*E05B 81/34* (2014.01)
*E05B 85/02* (2014.01)

(58) Field of Classification Search
CPC .......... E05B 81/20; E05B 81/22; E05B 81/24; E05B 81/25; E05B 81/26; E05B 81/28; E05B 81/30; E05B 81/32; E05B 81/34; E05B 81/36; E05B 81/38; E05B 81/40; E05B 81/42; E05B 81/44; E05B 81/46; E05B 81/48; E05B 81/50; E05B 85/20; Y10T 292/1082
See application file for complete search history.

(56) References Cited

U.S. PATENT DOCUMENTS

| | | | | | |
|---|---|---|---|---|---|
| 4,689,511 | A * | 8/1987 | Baker | H02K 5/10 310/157 |
| 5,099,781 | A * | 3/1992 | Frank | H02K 5/10 384/473 |
| 6,376,949 | B1 * | 4/2002 | Hayslett | H02K 5/10 277/408 |
| 6,695,361 | B1 * | 2/2004 | Gleason | E05B 85/02 292/201 |
| 7,568,741 | B2 * | 8/2009 | Odahara | E05B 81/06 292/201 |
| 7,621,571 | B2 * | 11/2009 | Umino | E05B 81/16 292/201 |
| 9,957,736 | B2 * | 5/2018 | Taurasi | E05B 81/06 |
| 10,344,506 | B2 * | 7/2019 | Hernandez | E05B 81/24 |

FOREIGN PATENT DOCUMENTS

| | | | | |
|---|---|---|---|---|
| DE | 10324849 | B4 | 12/2005 | |
| DE | 102007052890 | A1 | 5/2009 | |
| DE | 102013000982 | B4 | 10/2015 | |
| DE | 10201512999 | A1 | 7/2017 | |
| DE | 102016103918 | A1 * | 9/2017 | E05B 79/20 |
| DE | 102016112482 | A1 * | 1/2018 | E05B 85/02 |
| DE | 102019127458 | A1 * | 4/2021 | E05B 17/08 |
| EP | 3281753 | A1 | 2/2018 | |
| GB | 621275 | A | 4/1949 | |
| JP | 2018012967 | A | 1/2018 | |

* cited by examiner

MOTOR VEHICLE LOCK

FIELD OF INVENTION

The invention relates to a motor vehicle lock comprising a locking mechanism having a rotary latch and at least one pawl, comprising an electrical drive unit, the drive unit interacting at least indirectly with the locking mechanism, and the drive unit comprising an electric motor having an output shaft and an output means that is fastened to the output shaft, preferably a gearwheel, and more preferably a worm gear.

BACKGROUND OF INVENTION

Today, locking systems in automotive engineering, as are used in doors, flaps, bonnets or ceilings, are frequently provided with electric drives which increase the comfort of the motor vehicle. It is thus possible, for example, to lock or unlock, or for example to close or release, the locking system by means of radio remote control, to name but a few examples for the use of electric drives in the motor vehicle lock. Even if the electric drives in the motor vehicle lock lead to increased comfort, a durability of the locking system must always be ensured, over the entire service life of the motor vehicle. In order to in particular allow for the gearwheels, levers and/or sliders driven by the electric drives to function for a long period of time, in a low-noise manner, and in a smooth-running manner, the locking systems and in particular the movable components of the locking system comprising lubricants are used.

If the lubricant, for example fats and/or oils, can ensure low-noise, long-lasting and smooth-running mutual engagement of the lock component, the penetration of lubricant into the inside of the electric drive and/or the electric motor is to be prevented as far as possible. If lubricants enter the inside of the motor, over time lubricant may be deposited on the winding insulation, as a result of which damage may occur at the electric drives, and in addition the cooling ratios of in the motor can be impaired. Various solution approaches are known from the prior art with respect to preventing lubricants from penetrating into the inside of the motor.

DE 2 004 167 A1 discloses an electric motor comprising a rolling bearing and shielding from oil mist, provided for the rolling bearing. In this case, the motor shaft is guided in a rolling bearing and retained in an end plate, between two bearing covers. Oil is guided in the direction of the rolling bearing by means of a nozzle, guided through the rolling bearing, and discharged from the bearing region again by means of the bearing cover and a drainage opening. In this case a disc comprising labyrinthine chambers interacts with a sealing ring, such that the oil or oil mist cannot reach into the inside of the motor.

An electric motor comprising a shaft seal for sealing a motor shaft of the electric motor is known from DE 103 24 849 B4. Lubricants which reach into the tooth gaps in the shaft, behind a sealing disc of the motor, are discharged in a purposeful manner. For this purpose, a rotating sealing disc which is rigidly connected to the motor casing is arranged behind the outside sealing disc. The rotating sealing disc has a grooved structure which guides the lubricant radially towards the outside, in a targeted manner. The lubricant is then conducted away via apertures in the outer sealing disc, via an annular gap. It is thus possible to prevent penetration of lubricant into the inside of the motor.

A further form of discharging the lubricant is known from U.S. Pat. No. 6,376,949 B1. In this case, a circular centrifuge disc is arranged on the output shaft of the motor, which disc overlaps at least an oil seal of the motor. Lubricants which reach the centrifuging disc are discharged by means of rotation and centrifugal force and reach a collection trough arranged in the cover of the motor, via which the lubricants are then discharged via a drainage line.

The sealing systems known from the prior art for discharging lubricant from the inside of the electric motor are complex in structure and sometimes require discharge lines beyond the seals themselves. Furthermore, the structural embodiments require installation space that is not available in motor vehicle locking systems. This is where the invention starts from.

SUMMARY OF INVENTION

The object of the invention is that of providing an improved motor vehicle lock. In particular, the object of the invention is that of keeping lubricant away from the region of an opening of the output shaft of the electric drive. Furthermore, the object of the invention is that of providing a structurally simple and cost-effective solution to conducting the lubricant away from the region of the electric motor.

The object is achieved by the features of independent claim 1. Advantageous embodiments of the invention are specified in the dependent claims. It is noted that the embodiments described in the following are not limiting; instead, any variations of the features described in the description and the dependent claims are possible.

According to claim 1, the object of the invention is achieved in that a motor vehicle lock is provided, comprising a locking mechanism having a rotary latch and at least one pawl, comprising an electrical drive unit, the drive unit interacting at least indirectly with the locking mechanism, and the drive unit comprising an electric motor having an output shaft and an output means that is fastened to the output shaft, preferably a gearwheel, and more preferably a worm gear, and a means for guiding and/or binding a lubricant being arranged between the electric motor and the output means. The design of the motor vehicle lock according to the invention now provides the possibility of conducting away or binding lubricant that could enter the region of an opening of the electric motor, and in particular in the region of the outlet of the output shaft of the electric motor. The electric drives or electric motors in motor vehicle locks do not require continuous lubricant supply, and therefore it is possible to completely discharge the lubricant arranged in the inside of the motor vehicle lock. Using a guide means and/or binder between the electric motor and the output means makes it possible for the lubricant to be conducted away and/or bound. This ensures that the windings in the interior of the electric motor remain free of fats and/or oils and/or moisture and/or dust from the inside of the motor vehicle lock.

In addition to the mentioned motor components, such as windings and insulation, of course the further motor components such as the collector, commutator, brushes and contacts are also protected from damage by lubricants. The penetration of substances may promote or bring about isolation, and/or lead to short circuits, which is reliably prevented by the structure according to the invention of the locking system.

In this case, discharging the lubricant in a targeted manner ensures that the lubricant is conducted away from the electric motor. Alternatively it is also conceivable for a binder to be used between the output means and the opening in the electric motor for the output shaft, which binder absorbs the lubricant entering said intermediate region. In this case, binding of the lubricant prevents the lubricant from penetrating into the inside of the electric motor.

If, within the meaning of the invention, reference is made to a motor vehicle lock, those motor vehicle locks are also included which are both electrically actuatable and also fix and/or hold, during operation of the motor vehicle, components that are movably arranged on the motor vehicle. The motor vehicle locks can be used for example in side doors, sliding doors, flaps, bonnets and/or covers, at the place where pivotably or displaceably mounted components are arranged on the motor vehicle. It is also advantageous to arrange the motor vehicle lock in a backrest of a seat.

In this case, the motor vehicle lock comprises a locking mechanism which comprises a rotary latch and at least one pawl. Preferably at least one pawl is arranged in a plane with the rotary latch, and is capable, in cooperation with a lock striker, of locking or holding the rotary latch in a position. In the case of an open locking mechanism, an inlet mouth of the rotary latch faces in the direction of a lock striker, a relative movement between the lock striker and the rotary latch resulting in pivoting of the rotary latch. The pawl is generally preloaded towards the rotary latch, such that the pawl comes into engagement with the rotary latch when a latching position is reached. In this case, it may be possible for a pre-latching position and a main latching position of the locking mechanism to be assumed.

The electrical drive unit interacts indirectly or directly with the locking mechanism. In this case an electric motor, preferably a DC motor, is provided, which is received securely in a casing of the motor vehicle lock. The electric motor drives an output means via an output shaft, which output means can for example be a gearwheel or for example a worm gear of a worm drive. The output means can, in turn, engage in a gear stage or form a gear stage, and interact with further components such as levers, sliders, or also a worm wheel. As a result, functional positions of the motor vehicle lock can be set or initiated by means of the electric drive. One or more electric motors can be used, in drive units, in the motor vehicle lock. In this case, a drive unit can for example interact indirectly with the locking mechanism and release the locking mechanism, lock the locking system such that release can be prevented, transfer the locking mechanism or the rotary latch from a pre-latching position into a main latching position, or for example insert a child safety lock, to describe but a few functions, by way of example, in the locking system which, however always have indirect influence on the locking mechanism. The release can be triggered or prevented, or closure of the locking mechanism can be initialized.

In this case, the output means is connected to the output shaft or motor shaft. In this case, the output shaft preferably has a D-shaped cross section which interacts with a cooperating opening in the output means.

In one variant, the guide and/or binding means comprises means for discharging the lubricant, in particular a discharge collar or a centrifuge collar. The guide and/or binding means can be formed, for example, from a rotationally symmetrical plastics component that is mounted on the output shaft, grooves being formed in the plastics component which allow for the lubricant to be transported away. A rotational movement of the guide and/or binding means makes it possible for the lubricant to then be discharged from the region of the output shaft in a targeted manner. A discharge collar can thus be formed by a spiral groove which transports the lubricant, by means of centrifugal force, into a region of the lock casing which is non-critical for the lubricant.

It is also conceivable for the discharge means to be formed as a centrifuge collar, a centrifuge collar being formed for example in a rotationally symmetrical manner or merely as a guide groove that extends selectively, from the cover of the output shaft. In this case, the groove can extend in a straight line, proceeding from the output shaft, radially towards the outside. The discharge means is preferably in direct contact with the output means which can lead the lubricant directly to the output means. Irrespective of the geometrical design of the discharge means, the discharge means operates in such a way that the rotational energy introduced into the output shaft by the electric motor hurls the lubricant out of the opening region of the output shaft.

If the guide and/or binding means is formed integrally with the output means, a further advantageous variant of the invention thus results. It is advantageously possible for the guide and/or binding means to be formed integrally, i.e. for example in the form of an injection molded part. In this case, an integral design provides the advantage of cost-effective manufacture and the possibility of uninterrupted guidance of the lubricant that is to be conducted away. If the output means is designed for example as a plastics gearwheel or plastics worm gear, gutters or for example a discharge collar can be formed on the worm gear, at high degrees of freedom. It is advantageously also possible, however, for the worm gear to be formed of a metal material, onto which for example a drainage collar or a centrifuge collar for example can be injection-molded. Thus, an integral design can also be produced as a composite material part.

In this case it is also conceivable for a composite material part in the form of a metal worm gear or a metal gearwheel, comprising an injection-molded plastics component having discharge grooves, to be formed, which part in turn interacts with absorbent binding means. In this case, the absorbent binding means can be molded onto or joined to the discharge means. As a result, it may be possible for the discharge means to be formed of the output means, discharge means and binding means.

In an advantageous variant of the invention, the electric motor is received in a lock casing, and the guide means overlaps the lock casing such that it is possible to allow for the lubricant to be discharged, in a region outside of a motor receptacle in the lock casing. The electric motor is preferably retained in the lock casing of the motor vehicle lock in a form-fitting manner. In this case, the casing comprises an opening through which at least the output shaft protrudes from the motor receptacle. In this case, the motor receptacle can also be formed so as to be collar-shaped, such that some degree of a protective function for the outlet opening of the motor shaft can already be achieved, simply from the design of the lock casing. In an advantageous manner, the guide and/or binding means overlaps at least the opening of the motor receptacle such that a lubricant can be discharged in such a way that the lubricant cannot be guided into the region of the through-opening of the output shaft. As a result, the output shaft and in particular the motor windings inside the electric motor are purposely protected from the lubricants.

If the guide and/or binding means overlaps the motor receptacle in a funnel-shaped or hat-shaped manner, a further advantageous variant of the invention thus results. A hat-shaped overlap of the motor receptacle and in particular of the through-opening of the output shaft, by the lock casing that receives the electric motor, provides maximum protection from the lubricant being introduced into the inside of the electric motor. Furthermore, a hat-shaped or funnel-shaped design of one end, for example of an integral plastics end of a worm gear of a worm drive, can also be produced in a cost-effective and structurally simple manner.

In a further variant, the guide and/or binding means interacts with the lock casing in a form-fitting manner. In this case, it is conceivable for the lock casing of the motor vehicle lock to comprise ribs which protrude into the region of the output means. If the output means then comprises, for example, guide ribs that are formed or injection molded-on, it is possible to close the access region of the output shaft in the electric motor. In this case it is possible, for example, for the guide and/or binding means to surround the output means in an annular manner, and to form a for example oblique or serpentine shape. It is also conceivable that it may be possible for a type of labyrinth seal to be formed by the annular extension and the lock casing. In this case, the annular guide means and the lock casing engage in one another in a form-fitting manner, such that very small annular gaps arise, which prevent penetration of the lubricant. It is advantageously possible for discharge of the lubricant to be achieved by the combination of the guide means and the lock casing.

If the guide and/or binding means is formed as a rubbery-elastic seal, a further advantageous variant of the invention thus results. In many embodiments, rubbery-elastic seals are also known as shaft seals. It is thus possible for a rubbery-elastic seal to be incorporated into the motor vehicle lock in a cost-effective and structurally simple manner. The seal is preferably fastened to the lock casing, or arranged between the lock casing and the electric motor.

The output shaft protrudes through the seal, the opening in the rubbery-elastic seal corresponding to the diameter of the output shaft, such that secure sealing of the electric drive can be made possible. In particular, in this case the lock casing of the motor vehicle can interact with the rubbery-elastic seal such that the rubbery-elastic seal entirely surrounds the electric motor, with respect to the output means. In this variant, too, the lubricant is reliably discharged, such that no lubricant can enter the interior of the motor. If the guide and/or binding means can be formed as a felt pad, a further advantageous variant of the invention thus results. A thin felt pad, which may be round or cornered, can function as an expedient seal between the motor and the output means. In this case, the felt pad can either be mounted over an output shaft end, or the felt pad comprises a mounting slit, such the felt pad can be inserted into the lock casing subsequently. It is advantageously possible for the housing to comprise a guide for the felt pad, such that simple mounting of the felt pad can be made possible, and such that reliable positioning of the felt pad can be made possible. In this case, the felt pad can also be received in an extensive manner, between a casing shell and a casing cover of the motor vehicle lock, such that all-around sealing of the opening of the output shaft in the motor can be made possible.

In this case, the felt pad simultaneously forms a lubricant binding means, such that the lubricant can be discharged, and at the same time, in the case of highly viscous lubricants, such as warm or hot oils, absorption of the oils can be made possible. In this case, the felt pad can also be formed in a multi-layered manner, as a composite material disc, such that for example a sealing plastics layer interacts with a felt layer. Lubricant absorption and lubricant discharge can take place in said material combination. In particular if the felt pad is saturated, the combination of a felt pad and a plastics layer provides a reliable closure means for the lubricant.

Advantageously, and in a further variant, the felt pad can be guided and/or fixed in the casing, in particular guided in grooves of the casing. Storing the felt pad in the casing of the motor vehicle lock provides for the possibility of mounting the felt pad in a reliable manner, and allowing for permanent orientation of the felt pad with respect to the output shaft. In this case, grooves that are formed in the casing can serve as guide aids for inserting and, following insertion, for fixing, the felt pad.

In one embodiment of the invention, the drive means is formed of a metal material, and the guide and binding means is formed of a plastics material. The combination of two materials from the metal output means and for example thermoplastic guide and/or binding means is advantageous in that large forces can be transferred over long service lifetimes, and a further advantage is that the guide and/or binding means can be produced in a cost-effective manner. The combination of a plurality of materials can thus provide a targeted selection of materials, allowing for reliable discharge of lubricants from the motor of the motor vehicle lock.

The advantages described according to the invention can also be transferred to an electromechanical drive module, an electric drive unit being provided, and the drive unit comprising an electric motor having an output shaft and an output means that is located on the drive shaft, preferably a gearwheel and more preferably a worm wheel. In this case, a means for guiding and/or binding a lubricant is arranged between the electric motor and the output means, the drive module being part of a micro drive, in particular a charging plug lock or a closing aid or a locking means in a motor vehicle. This design of a drive module makes it possible, according to the invention, for the electric motor to be protected against penetration of a fluid.

BRIEF DESCRIPTION OF DRAWINGS

The invention will be explained in greater detail in the following, with reference to the accompanying drawings and on the basis of a preferred embodiment. The principle applies, however, that the embodiment does not limit the invention but is merely one embodiment. The features shown can be implemented individually or in combination with further features from the description and from the claims.

In the drawings.

DETAILED DESCRIPTION

Figure 1:
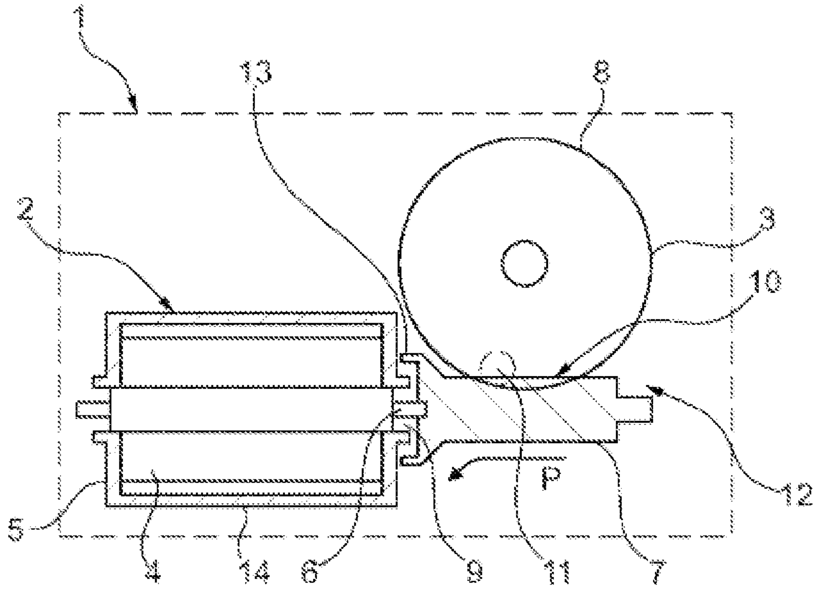
FIG. 1 is a schematic view of a motor vehicle lock comprising a drive unit and a gear stage and a funnel-shaped guide and/or binding means.

FIG. 1 is a schematic view of a motor vehicle lock 1, shown as a dotted line. The motor vehicle lock 1 comprises a drive unit 2 having a worm wheel transmission 3, the worm wheel transmission 3 interacting indirectly with a locking mechanism (not shown). The drive unit 2 comprises an electric motor 4 which is received in a lock casing 5 in a form-fitting manner. An output shaft 6 protrudes out of the electric motor 4 and carries a drive means 7, the drive means 7 interacting with a worm gearwheel 8. The worm gearwheel 8, in turn, can interact directly with a lever, gearwheel and/or slide element.

As can furthermore be seen from FIG. 1, the output shaft 6 protrudes out of an opening 9 of the lock casing 5. Lubricant 11 can preferably be arranged in the engagement region 10 between the worm gearwheel 8 and drive means 7, such that, once the motor vehicle lock 1 has been assembled, favorable friction ratios can be achieved in the gear stage 12. If the lubricant 11 then begins to flow, owing to temperature influences and/or owing to frictional heat, a lubricant flow in the direction of the arrow P may result at a corresponding direction of rotation of the drive means 7. Fats are preferably used as the lubricant 11. At higher temperatures, said lubricants 11 may liquify and, at a corresponding direction of rotation of the drive means 7 and/or position of the drive unit 2 in the motor vehicle, enter the opening region 9 of the output shaft 6. The design according to the invention of the guide means 13 in the form of a funnel makes it possible for the lubricant 11 to be conducted away from the opening 9. In this case, the guide means 13 overlaps the lock casing 5, at least in the opening region 9 of the drive unit 2.

The guide means 13 surrounds the motor receptacle 14, at least to such an extent that the lubricant 11 is discharged into a region outside of the opening 9. The design of the guide means 13 according to the invention thus means that no lubricant 11 can enter the opening region 9 of the output shaft 6.

Figure 2:
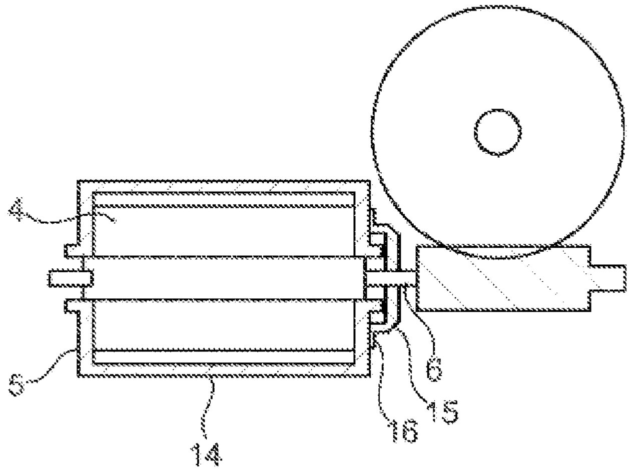
FIG. 2 shows a further embodiment of a guide and/or binding means in the form of a rubbery-elastic seal.

FIG. 2 shows an alternative embodiment of a guide means 15. In this embodiment, the guide means 15 is formed as a rubbery-elastic seal 15. The rubbery-elastic seal 15 surrounds the drive shaft 6 in a sealing manner, and is rigidly connected, over the periphery, by means of a sealing flange 16, to the motor receptacle 14 of the lock casing 5. Using established and commercially available rubbery-elastic seals makes it possible for a cost-effective lubricant seal 15 to be provided, for sealing the motor windings.

Figure 3:
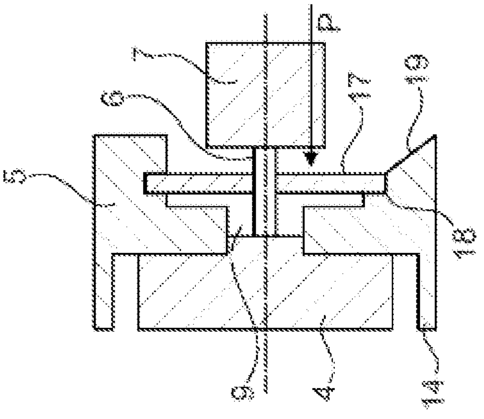
FIG. 3 is a detailed view of the intermediate region between the electric motor and the output means, comprising a guide and/or binding means in the form of a felt pad.

FIG. 3 shows an alternative embodiment of a guide means. In this embodiment, the guide and/or binding means 17 is formed as a felt pad 17. The felt pad is fixedly accommodated in grooves of the lock casing 5. In this case, the felt pad 17 rests on the output shaft 6 in a sealing manner. If lubricant 11 now reaches in the direction of the arrow P, from the drive means 7 towards the opening, 9 the lubricant 11 is thus absorbed by the felt pad 17. For example in the case of saturation of the felt pad 17, the excess lubricant can be discharged for example by means of a slope 19 in the lock casing 5.

Figure 4:
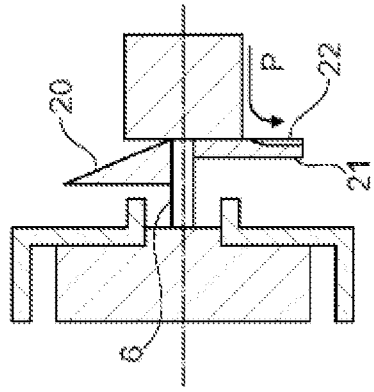
FIG. 4 shows two alternative embodiments of guide and/or binding means, comprising a centrifuge element and a conical guide means.

FIG. 4 shows two alternative embodiments of guide and binding means 20, 21. In this case, the guide and/or binding means 20 is conical or is formed as a conical annulus. Since the output shaft is preferably D-shaped, the guide and/or binding means 20 can be pushed onto the output shaft 6, by means of a corresponding opening, and fixedly mounted.

In the embodiment according to the guide and/or binding means 21, the guide means 21 extends radially towards the outside, an extension being required only in regions in order to discharge the lubricant. A guide groove 22 is formed in the guide and/or binding means 21, which groove allows for targeted discharge of the lubricant 11.

Figure 5:
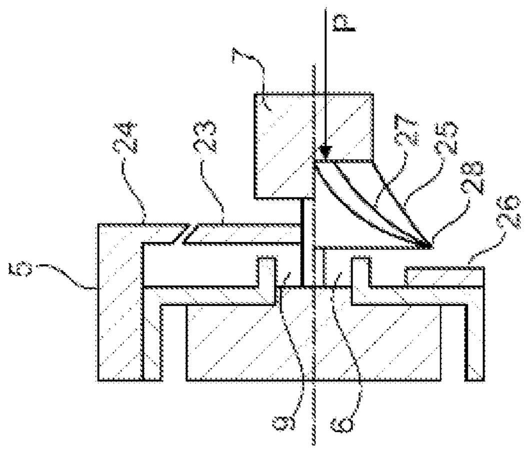
FIG. 5 shows two alternative embodiments comprising a lubricant discharge collar and a guide means that interacts with the lock casing in a form-fitting manner.

FIG. 5 shows two further embodiments of a guide and/or binding means. A guide means 23 engages in an extension 24 of the lock casing 5 in a form-fitting manner. As a result, the lubricant can be discharged from the opening 9. In this case, the guide means 23 is rigidly connected to the output shaft 6.

In a further embodiment of a guide and/or binding means, a combined embodiment of the guide means 25 and binding means 26 is shown. The guide means 25 may be formed so as to be integral with the drive means 7, or may be able to be injection-molded onto the drive means 7. Furthermore, the guide means 25 comprises a guide groove 27, such that the lubricant 11 can be discharged in a targeted manner. If the lubricant 11 arrives in the guide groove 27, from the direction of the arrow P, the lubricant 11 is conducted radially towards the outside, in the event of a rotation of the output shaft, owing to the centrifugal force. A binding means 26 is arranged in an end region 28 of the guide groove 27, it being possible, for example, for the binding means 26 to be mounted on the motor receptacle 14 as a circular disc. The binding means can for example be a felt pad. Targeted discharge of the liquifying lubricant makes it possible for the opening 9 to be reliably protected against penetration of the lubricant 11. The motor windings can thus be protected against contamination.

LIST OF REFERENCE SIGNS

1 motor vehicle lock
2 drive unit
3 worm wheel transmission
4 electric motor
5 lock casing
6 output shaft
7 drive means
8 worm gearwheel
9 opening
10 region
11 lubricant
12 gear stage
13, 15, 17,
20, 21, 23,
25, 26 guide means and/or binding means
14 motor receptacle
16 sealing flange
18 grooves
19 slope
20, 27 guide groove
28 end region
P arrow

The invention claimed is:

1. A motor vehicle lock comprising:

a locking mechanism having a rotary latch and at least one pawl;

an electrical drive unit that interacts with the locking mechanism, the electrical drive unit comprising an electric motor having an output shaft and an output means fastened to the output shaft;

a lock casing configured to receive the electric motor, wherein a front face of the lock casing includes an opening and the output shaft extends through the opening, wherein except for the opening, the front face of the lock casing is solid, wherein the lock casing includes a lip formed integrally on the front face of the lock casing and configured to extend outwardly from the front face to extend along an edge of the opening; and a guide for guiding and/or binding a lubricant arranged between the opening and the output means, wherein the guide overlaps the opening and the lip.

2. The motor vehicle lock according to claim 1, wherein the guide is configured to discharge the lubricant.

3. The motor vehicle lock according to claim 2, wherein the guide includes a discharge collar or a centrifuge collar.

4. The motor vehicle lock according to claim 1, wherein the guide is formed in one piece with the output means.

5. The motor vehicle lock according to claim 1, wherein the guide overlaps the lock casing whereby the lubricant is discharged in a region outside of a motor receptacle in the lock casing.

6. The motor vehicle lock according to claim 5, wherein the guide overlaps the motor receptacle in a funnel-shaped or hat-shaped manner.

7. The motor vehicle lock according to claim 5, wherein the guide interacts with the lock casing in a form-fitting manner.

8. The motor vehicle lock according to claim 5, wherein the output shaft protrudes out of an opening of the lock casing and the guide is configured to discharge the lubricant outside of the opening.

9. The motor vehicle lock according to claim 1, wherein the guide includes a rubbery-elastic seal.

10. The motor vehicle lock according to claim 1, wherein the guide includes a felt pad.

11. The motor vehicle lock according to claim 10, wherein the felt pad can be guided and/or fixed in the lock casing.

12. The motor vehicle lock according to claim 11, wherein the felt pad is guided in grooves of the lock casing.

13. The motor vehicle lock according to claim 10 further comprising the lock casing having a slope for discharging lubricant.

14. The motor vehicle lock according to claim 1, wherein the output means is formed of a metal material and the guide is formed of a plastic material.

15. The motor vehicle lock according to claim 1, wherein the output means includes a gear wheel.

16. The motor vehicle lock according to claim 1, wherein the guide is formed to be a rotationally symmetrical component mounted to the output shaft.

17. The motor vehicle lock according to claim 1 further comprising a gear stage engageable by the output means.

18. The motor vehicle lock according to claim 1 further comprising a sealing flange for rigidly connecting the guide to a receptacle of the lock casing.

19. An electromechanical drive module comprising the motor vehicle lock according to claim 1, wherein the electromechanical drive module is part of a micro drive.

20. The electromechanical drive module according to claim 19, wherein the electromechanical drive module is part of a charging plug lock or a closing aid or a locking device for a motor vehicle.

* * * * *